(12) United States Patent
Kubota et al.

(10) Patent No.: US 7,989,111 B2
(45) Date of Patent: Aug. 2, 2011

(54) FUEL CELL AND INFORMATION ELECTRONIC DEVICE MOUNTING THE FUEL CELL

(75) Inventors: Osamu Kubota, Hitachi (JP); Kenichi Souma, Mito (JP)

(73) Assignee: Hitachi, Ltd., Tokyo (JP)

( * ) Notice: Subject to any disclaimer, the term of this patent is extended or adjusted under 35 U.S.C. 154(b) by 1194 days.

(21) Appl. No.: 11/626,547

(22) Filed: Jan. 24, 2007

(65) Prior Publication Data

US 2007/0298294 A1 Dec. 27, 2007

(30) Foreign Application Priority Data

Jun. 21, 2006 (JP) ................. 2006-170849

(51) Int. Cl.
*H01M 8/06* (2006.01)
(52) U.S. Cl. ........................... 429/413; 429/492
(58) Field of Classification Search .......... None
See application file for complete search history.

(56) References Cited

U.S. PATENT DOCUMENTS

| | | | |
|---|---|---|---|
| 6,766,817 B2 | 7/2004 | Da Silva | |
| 6,918,404 B2 | 7/2005 | Da Silva | |
| 7,066,586 B2 | 6/2006 | Da Silva | |
| 2009/0007639 A1* | 1/2009 | Shiozawa | .......................... 73/40 |
| 2009/0104498 A1* | 4/2009 | Wakizoe et al. | ................. 429/30 |

FOREIGN PATENT DOCUMENTS

JP 2006-049153 2/2006

OTHER PUBLICATIONS

Email from Elson Silva, dated Apr. 28, 2008, subject IDS request for US 20070298294.

* cited by examiner

*Primary Examiner* — John S Maples
(74) *Attorney, Agent, or Firm* — Antonelli, Terry, Stout & Kraus, LLP.

(57) ABSTRACT

A fuel cell includes cell units each composed of a hydrogen ion conductive polymeric electrolyte membrane, a pair of electrodes arranged on the front and rear faces of the hydrogen ion conductive polymeric electrolyte membrane, and a diffusion layer contacting the electrodes to cover the electrodes. The cell units are pushed down by an end plate having a current-collecting metallic plate and a resin substrate for fixing the current-collecting metallic plate. A layer having a humidity-adjusting component is formed on the surface of the resin substrate of the end plate.

3 Claims, 10 Drawing Sheets

(a)

(b)

(a)

(b)

(a)

(b)

(a)

(b)

(a)

(b)

(a)

(b)

FUEL CELL AND INFORMATION ELECTRONIC DEVICE MOUNTING THE FUEL CELL

CLAIM OF PRIORITY

The present application claims priority from Japanese Patent Application serial No. 2006-170849, filed on Jun. 21, 2006, the content of which is hereby incorporated by reference into this application.

FIELD OF THE INVENTION

The present invention relates to a direct methanol fuel cell.

BACKGROUND OF THE INVENTION

Fuel cells have advantages that they have high energy efficiency since electric energy is electrochemically taken out directly from a fuel, and further they are easily in harmony with surroundings since materials discharged therefrom are mainly made of water. For this reason, made are attempts of applying the cells to automobiles, dispersed power sources, information electronic devices, and so on. In particular, in connection of information electronic devices, attention is paid thereto as power sources which can be driven for a long term instead of lithium cells, and various information electronic devices each mounting a fuel cell are suggested.

Out of fuel cells wherein methanol is used as methanol, the so-called direct methanol fuel cell (referred to as DMFC hereinafter), wherein liquid methanol is directly oxidized to take out electricity, has an advantage that a cell system therefor can be relatively easily made up since a reforming unit and so on are unnecessary.

The power generating principle of the DMFC is represented by the following expressions (1) to (3):

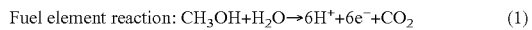

Fuel element reaction: $CH_3OH+H_2O \rightarrow 6H^+ + 6e^- + CO_2$ (1)

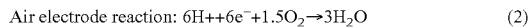

Air electrode reaction: $6H^+ + 6e^- + 1.5O_2 \rightarrow 3H_2O$ (2)

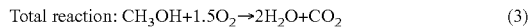

Total reaction: $CH_3OH + 1.5O_2 \rightarrow 2H_2O + CO_2$ (3)

As represented by the expression (2) or (3), water is generated in the air electrode in the DMFC. Water is in the form of water vapor when it is generated. However, in accordance with the structure or the material of the air electrode and conditions for the treatment, the water partially turns into dew condensation water. The dew condensation water is partially discharged outside the air electrode while the other part of the water remains in the air electrode. This causes an increase in the wettability of the gas diffusion electrode or the cathode catalyst layer with the passage of time. Accordingly, the DMFC has a problem that pores which are channels for supplying oxygen gas are blocked up in the gas diffusion electrode and the cathode catalyst layer. The performance of the air electrode depends on the supplied oxygen amount; therefore, when the pores are blocked up, oxygen gas is not sufficiently supplied to the electrode to result in a phenomenon that the performance falls. When the cell is stopped for a long term, the polymeric electrolyte or electrolyte membrane in the electrodes is not swelled by the generated water sufficiently. Thus, the amount of a network based on hydrogen ions decreases so that the ion conductivity of the electrodes falls, resulting in a drop in the cell performance.

As a technique for collecting water generated in the cathode, JP-A-2006-49153 is known.

SUMMARY OF THE INVENTION

In the case of a planar fuel cell, wherein cell units are arranged into a planar form and connected to each other in series, it is necessary for the supply of oxygen into its cathode to make a through hole in the end plate of the cathode. However, near this through hole, water vapor generated in the cathode can turn to dew condensation water with ease. As a result, the generated water dews the through hole in the cathode end plate so that the power of the cell falls remarkably.

In the meantime, water content releases easily from the polymeric electrolyte membrane which constitutes the cell units when the power is lowered or the driving of the cell is stopped. Thus, the fuel cell has a problem that the polymeric electrolyte membrane gets dry so as to deteriorate.

An object of the present invention is to provide a fuel cell which exhibits a high performance stably for a long term by adjusting the humidity of the vicinity of a through hole in its cathode end plate, and an information electronic device into which the fuel cell is integrated.

Accordingly, the present invention is a fuel cell comprising a cell unit comprising an anode, a cathode and a hydrogen ion conductive polymeric electrolyte membrane formed between the anode and the cathode, and a member fitted to the side of the cathode of the cell unit, wherein the member has a layer comprising a humidity-adjusting component.

According to the invention, there can be provided a fuel cell which exhibits a high performance stably for a long term and an information electronic device into which the fuel cell is integrated.

DETAILED DESCRIPTION OF THE PREFERRED EMBODIMENTS

Best modes for carrying out the invention will be described by way of specific embodiments hereinafter. However, the invention is not limited thereto.

Embodiment 1

Figure 1:
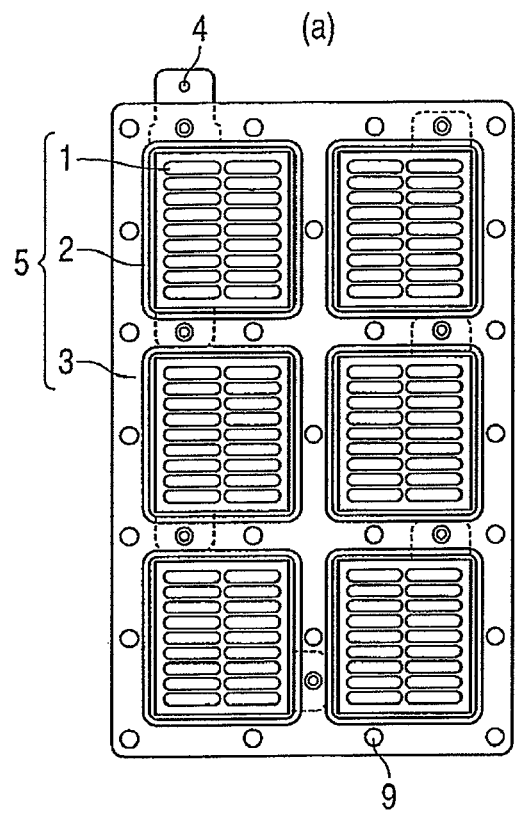
FIGS. 1A and 1B are views illustrating an example of a fuel cell end plate in one aspect of the fuel cell of the present invention.
Figure 1:
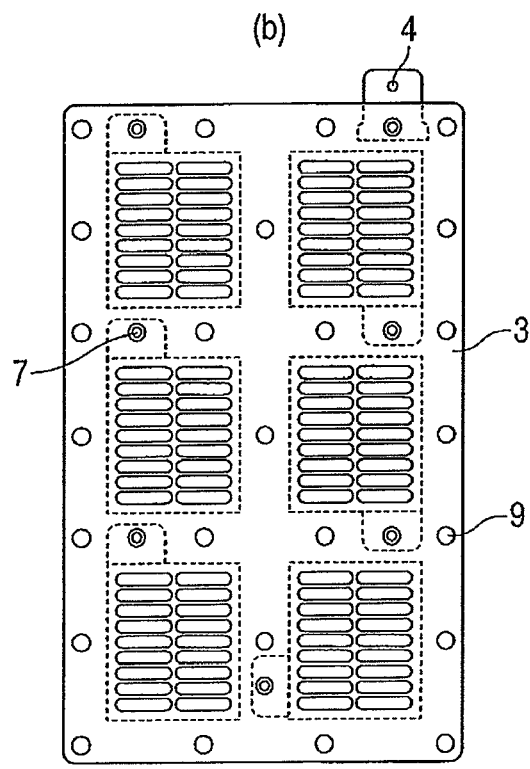

FIGS. 1(a) and (b) show a fuel cell end plate. Reference number 1 represents current collecting plates; 2, gaskets; 3, a resin substrate; 4, an external terminal connecting section; and 5, a fuel cell end plate composed of the members 1 to 4. The external terminal connecting section 4 is exposed to a side face of the fuel cell end plate 5. FIG. 1(a) is a view obtained when the fuel cell end plate 5 is viewed from the side on which the gaskets 2 are set up. FIG. 1(b) is a view obtained when the side opposite to the side illustrated in FIG. 1(a) is viewed. As is understood from FIGS. 1(a) and (B), the end plate has a structure wherein the current collecting plates 1 are not exposed to the side on which the gaskets 2 cannot be viewed. For easy understanding, the current collecting plates 1 and portions of the external terminal connecting section 4 latent in the fuel cell end plate 5 are represented by dot lines.

Figure 2:
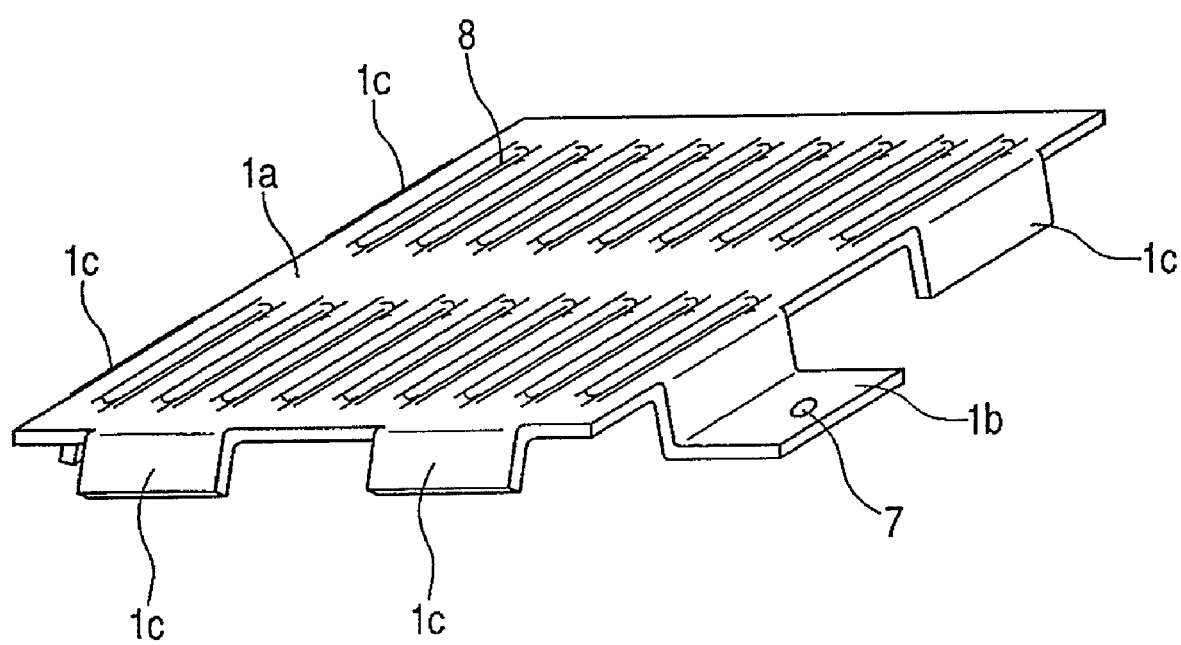
FIG. 2 is a view illustrating an example of a current collecting plate which constitutes the fuel cell end plate.
Figure 3:
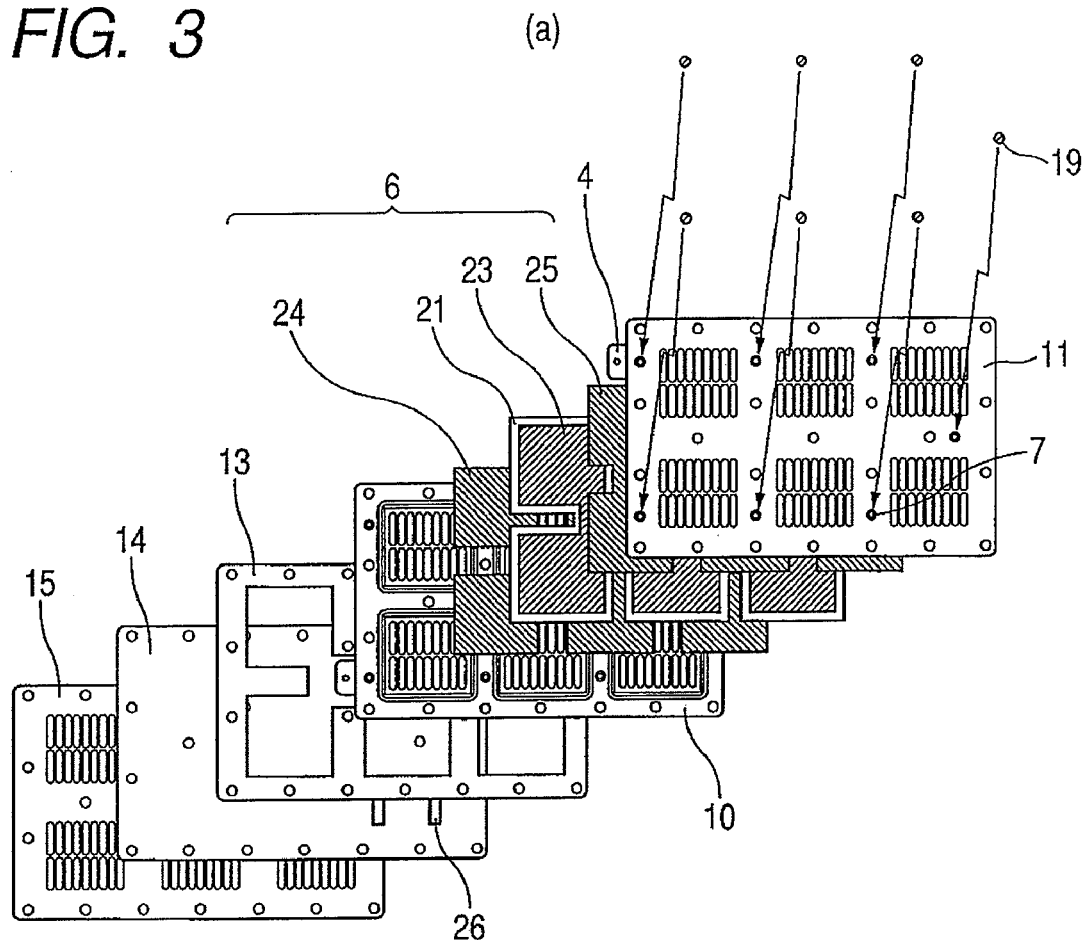
FIGS. 3A and 3B are views illustrating a manner of fabricating the fuel cell end plate.
Figure 3:
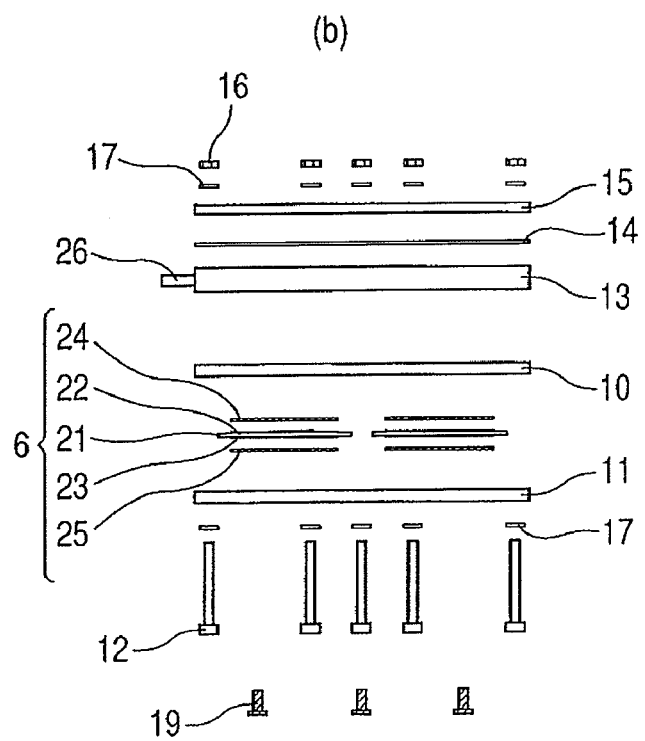

The single fuel cell end plate 5 has six current collecting plates 1 and six gaskets 2. When a cell is formed, six cell units are connected to each other in series. The fuel cell end plate 5 is formed by integration-molding the current collecting plates 1, the gaskets 2, the resin substrate 3 and the external terminal connecting section 4. The molding is performed at two separated stages. At the first stage, the current collecting plates 1, the resin substrate 3 and the external terminal connecting section 4 are integrated with each other. At the second stage, the gaskets 2 and the resin substrate 3 are integrated with each other. As illustrated in FIG. 2, each of the current collecting plates 1 is formed by bending a single plate original. The current collecting plate 1 has a face 1a, a face 1b, and faces 1c, and the face 1a contacts an MEA 6 (see FIG. 3). The face 1b has a terminal connecting section 7. The faces 1c are faces formed to aim to fit the current collecting plate 1 and the resin substrate 3 strongly to each other at the time of the integration-molding. Grooves 8 are made in the face 1a. When the fuel cell end plate 5 is used in an anode electrode, a fuel is supplied and carbon dioxide is discharged through the grooves 8. When the fuel cell end plate 5 is used in a cathode electrode, air is supplied and water is discharged through the grooves 8.

Each of the gaskets 2 is formed on the resin substrate 3 in such a manner that the gasket 2 does not contact the current collecting plate 1 and extends along the outer circumference of the face 1a. Reference number 9 represents through holes. As is understood from FIG. 1, the area of the fuel cell end plate 5 depends on the size of the current collecting plates 1. In the embodiment, a reduction in the size of the current collecting plates 1 is investigated in order to aim to mount a fuel cell containing the current collecting plates 1 onto a portable device in the future.

The size of the face la of each of the current collecting plates 1 is not made small since the size is related to the power to be obtained, and the face 1b is made as small as possible. The external terminal connecting section 4 is formed for the following purpose: after the fabrication of a cell from the fuel cell end plate 5 and so on, the section 4 is connected to an external terminal to gain electric power from the cell.

The material for each of the members 1 to 4 is as follows: The material for the current collecting plates 1 and the external terminal connecting section 4 needs to be a material which is stable in the reaction field, and is further able to collect electricity. Thus, the material may be carbon or a metal (such as gold, platinum, SUS, or titanium). In embodiment 1, the material is titanium. However, the surface thereof is plated with gold, so as to give a layer having a thickness of several micrometers since titanium itself has a high electric resistance by effect of an oxidized film formed on the surface of titanium. The material for the gaskets 2 needs to be a material stable in the reaction field. In the present embodiment, the material further needs to be a material having good moldability since the gaskets 2 are formed by integrating-molding. In this case, the material may be EPDM (ethylene/propylene/diene terpolymer), PET (polyethylene terephthalate), silicone resin or the like. In embodiment 1, the material is EPDM.

The material for the resin substrate 3 needs to be stable in the reaction field, and have hardness suitable for fastening the cell by functioning as a substrate for the fuel cell end plate 5. In embodiment 1, the material further needs to be a material having good moldability since the resin substrate 3 is formed by integration-molding. In this case, the material may be AS (acrylonitrile/styrene copolymer), PEEK (polyetheretherketone), PC (polycarbonate), VC (vinyl chloride), PBT (polybutylene terephthalate) or the like. In embodiment 1, the material is PBT. In embodiment 1, the current collecting plates 1 are integrated with the resin substrate 3; however, the current collecting plates 1 are not chemically bonded to the resin substrate 3. Consequently, in accordance with the precision of the molding, there may be generated a gap sufficient for the flow of a liquid between the current collecting plates 1 and the resin substrate 3. In such a case, a countermeasure is taken by causing, for example, silicone resin to flow into the gap, thereby filling the silicone resin into the gap.

Figure 4:
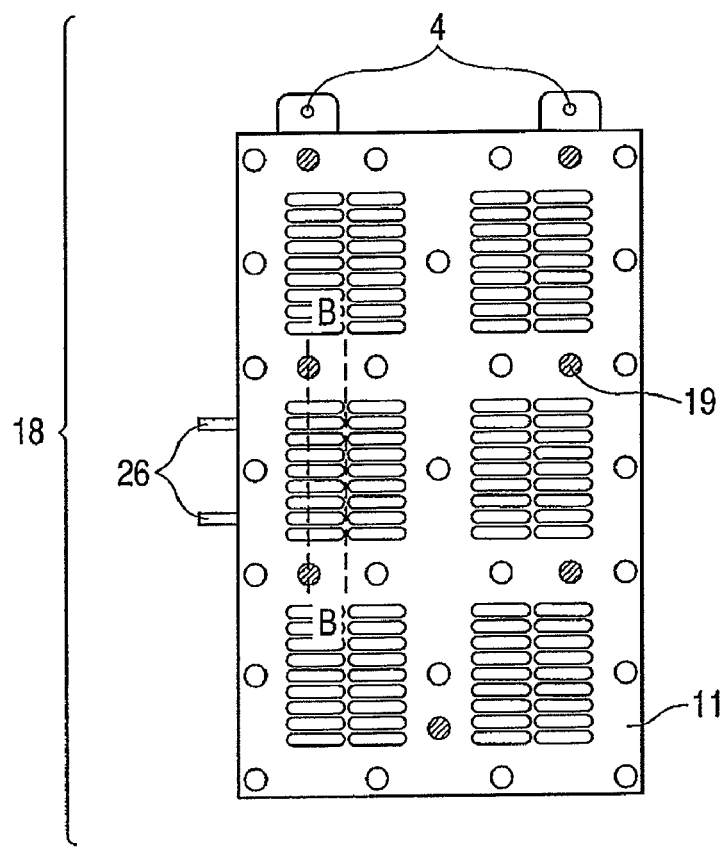
FIGS. 4A and 4B are view illustrating an example of the fuel cell end plate and a fuel cell module wherein the fuel cell end plate is used.
Figure 4:
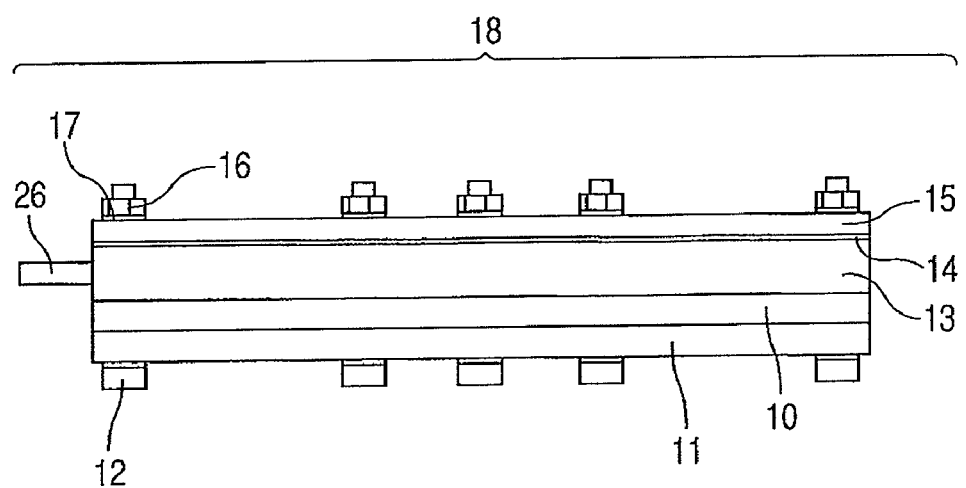
Figure 5:
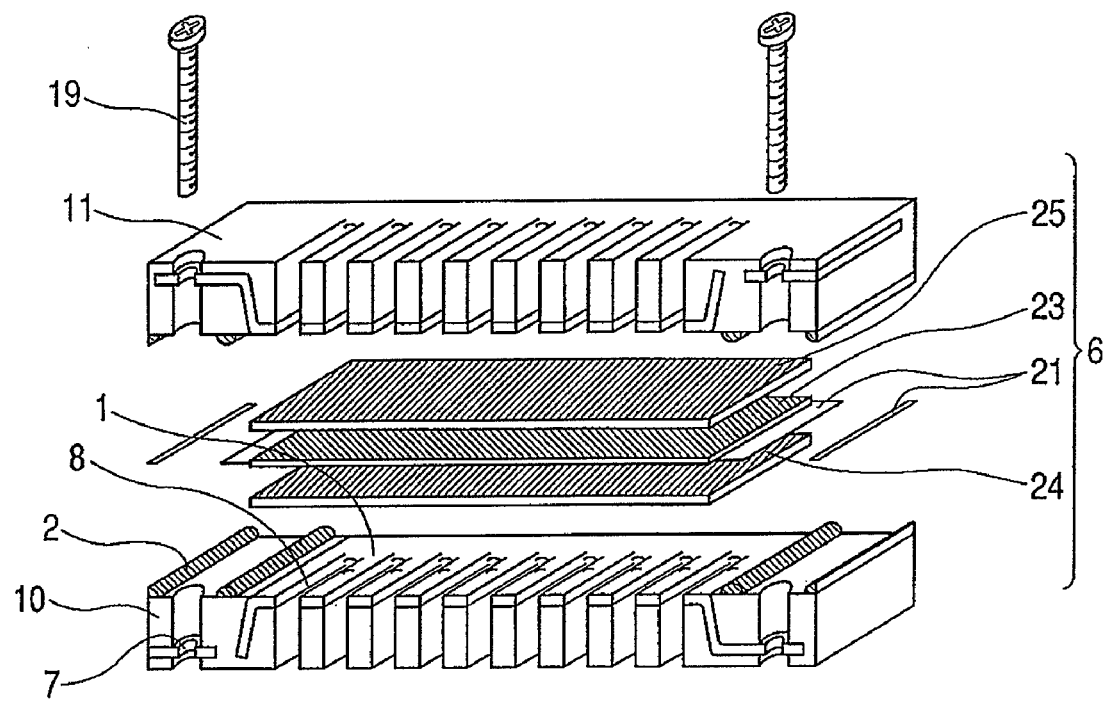
FIGS. 5A and 5B are sectional views of a fuel cell module fabricated by use of the fuel cell end plate.
Figure 5:
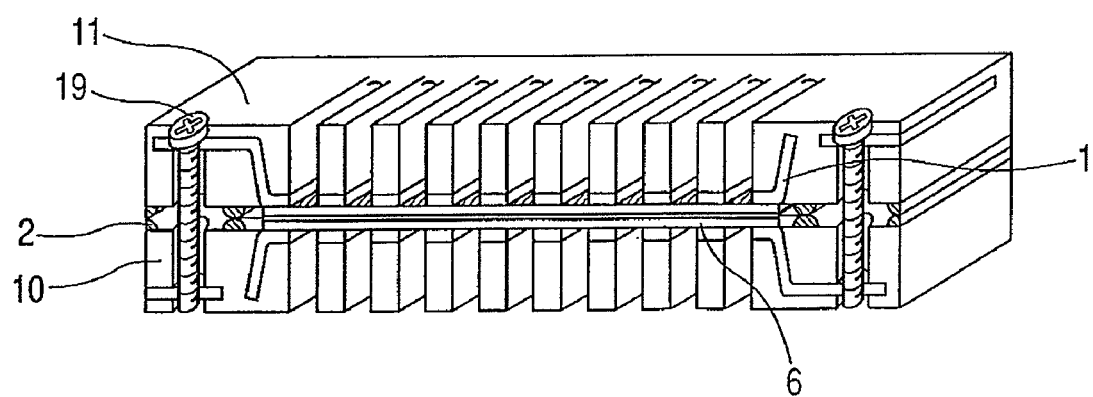
Figure 6:
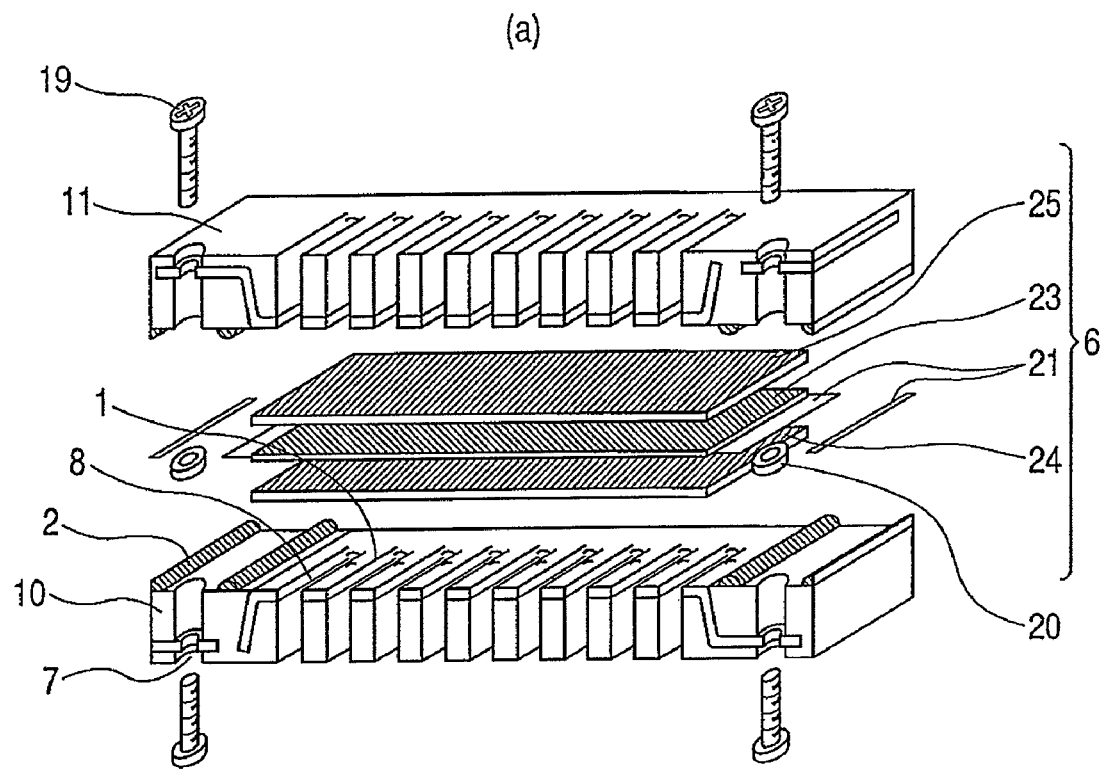
FIGS. 6A and 6B are sectional views of a fuel cell module fabricated by use of the fuel cell end plate.
Figure 6:
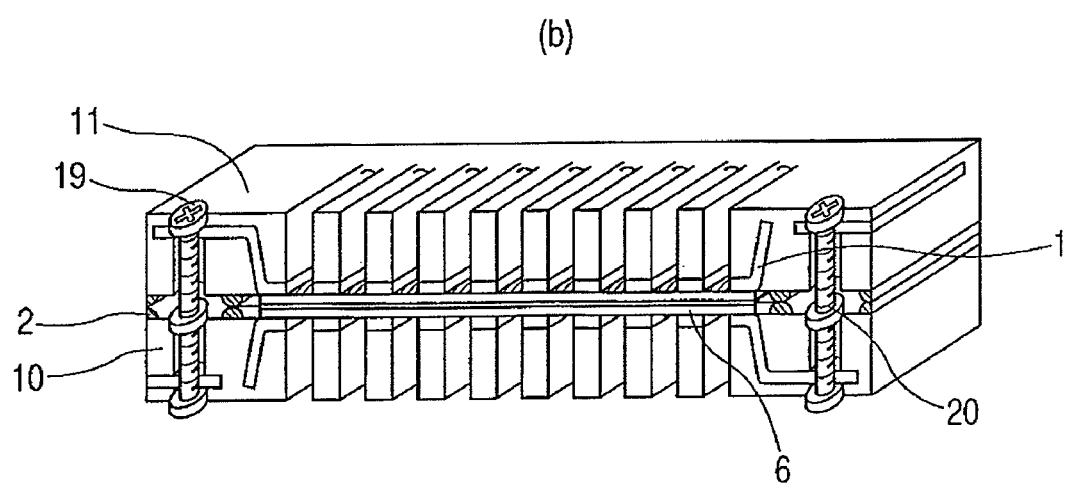

As illustrated in FIGS. 3(a) and (b), an MEA 6 is sandwiched between an anode end plate 10 and a cathode end plate 11, bolts 12 are inserted into the through holes 9, a fuel tank frame 13, a liquid-gas separating membrane 14, and a tank cover 15 are fitted to the outside of the anode end plate 10, and these members are fastened with nuts 16 with washers 17 and the bolts 12, thereby forming a fuel cell module 18 as illustrated in FIGS. 4(a) and (b). In FIG. 4(a), the bolts 12, the nuts 16 and the washer 17 are omitted. The individual cell units are connected to each other by use of current collecting bolts 19. FIGS. 5(a) and (b) are each a sectional view for understanding the situation of the connection between the cell units. The cross sections are each a cross section taken on line B-B in FIG. 4(a). The bolts 12, the fuel tank frame 13, the liquid-gas separating membrane 14, the tank cover 15, the nuts 16, and the washers 17 are not illustrated since FIGS. 5(a) and (b) are views drawn in a state that importance is attached to the connection between the cell units. FIG. 5(a) is a view before the fabrication, and FIG. 5(b) is a view after the fabrication. FIGS. 6(a) and (b) illustrate another situation of the connection between the cell units. In these figures also, the bolts 12, the fuel tank frame 13, the liquid-gas separating membrane 14, the tank cover 15, the nuts 16, and the washers 17 are not illustrated since the figures are views drawn in a state that importance is attached to the connection between the cell units. FIG. 6(a) is a view before the fabrication, and FIG. 6(b) is a view after the fabrication. Two current collecting volts 19 are inserted from both sides of two fuel cell end plates 5 to the inside thereof, and cell units are connected to each other with a single nut 20 and the bolts 19. When the method for the connection between the cell units illustrated in FIG. 5 is compared with that for the connection between the cell units illustrated in FIG. 6, the method illustrated in FIG. 6 makes a stronger connection possible, but makes the number of the required parts larger to make the work efficiency lower. Thus, in the present embodiment, the method illustrated in FIG. 5 is adopted. The current collecting bolts are exposed to the surface of the cathode end plate. When a tester is brought into contact with the current collecting bolts exposed to the surface of the cathode, the performance of each of MEAs can be examined in the production/fabrication of the fuel cell module 18. After the performance of each of the MEAs is examined, the current collecting bolts are covered with insulating members. In the present embodiment, each of the MEAs 6 is an MEA having a structure in which an electrolyte membrane 21 wherein an anode catalyst layer 22 is formed on one surface side thereof and a cathode catalyst layer 23 is formed on the other surface side is sandwiched a cathode diffusion layer 24 and an anode diffusion layer 25. A tube (not illustrated) is connected to a tube joint 26 fitted to the fuel tank frame 13, and further a machine for sending a fuel from the outside, such as a microtube pump (not illustrated), is connected to the tube. The fuel is then sent to the fuel cell module 18, whereby the module 18 can generate electric power. The gas-liquid separating membrane 14 is a membrane having a characteristic that the membrane can transmit gas but cannot transmit any liquid. Thus, the membrane 14 has a function of discharging carbon dioxide generated in the tank promptly from the inside of the tank. For the tank frame 13 and the tank cover 15, soft vinyl chloride resin is used. A material which is not easily eluted into a solution of methanol in water may be used, examples of the material including hard resins such as PTFE and epoxy resin, rubbery resins such as silicone resin and EPDM (ethylene propylene diene rubber), resins containing compounded glass fiber or carbon fiber, and metal materials such as aluminum, titanium and corrosion-protected magnesium alloy. Elastic bodies such as Belleville springs may be inserted between the bolts and the anode end plate or cathode end plate. The use of the elastic bodies makes it possible to prevent a fall in the sealing performance or the surface pressure onto the MEAs based on a deterioration of the sealing members with time.

In the fuel cell module obtained as described above, a layer of diatomaceous earth is formed on the outer surface of the cathode end plate 11.

Figure 7:
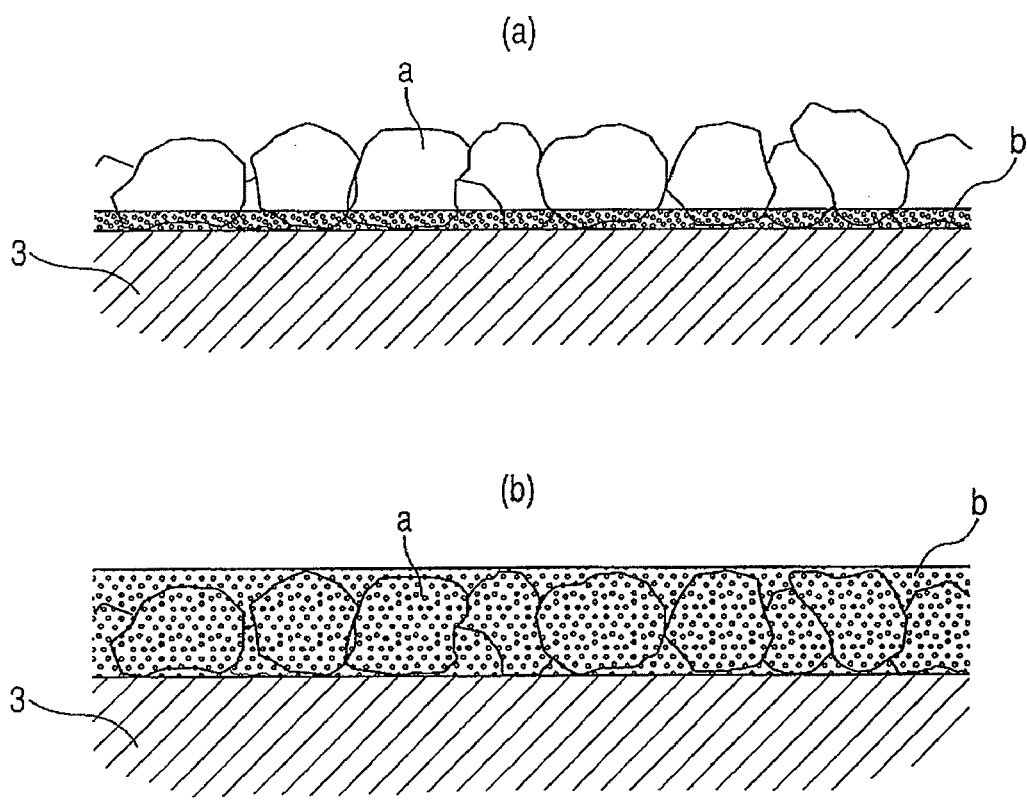
FIGS. 7A and 7B are views each illustrating a situation that a diatomaceous earth layer is formed.

The method for forming the layer will be described hereinafter. A spatula is used to paint an adhesive onto a surface not contacting any one of the MEAs 6, illustrated in FIG. 1(b), out of the surfaces of the cathode end plate 11, so as to give a thickness of several tens of micrometers to several hundreds of micrometers. Thereafter, diatomaceous earth is promptly sprinkled onto the adhesive layer to form a layer of the diatomaceous earth. The used adhesive is an adhesive which can be hardened by water content in the air. It is desired that the viscosity of the adhesive is high. If a low-viscosity adhesive is used, the adhesive goes into pores in the surface of the diatomaceous earth by capillarity. The diatomaceous earth is expected to exhibit a humidity-adjusting effect, and the effect is based on the pores in the surface thereof; thus, it is not preferred that the adhesive goes into the pores. As the used diatomaceous earth, diatomaceous earth having particle diameters of several hundreds of micrometers to several millimeters is selected out of commercially available diatomaceous earth species. The size of the particles to be selected is varied by the thickness of the adhesive layer. The size of the particles is preferably larger than the thickness of the adhesive layer. If particles having a smaller size than the thickness of the adhesive layer are selected, the diatomaceous earth is unfavorably buried into the adhesive layer. If the particles are buried into the adhesive layer, the adhesive goes into the pores in the diatomaceous earth surface by capillarity so that the effect expected for the diatomaceous earth cannot be obtained. A desired state of the formed diatomaceous earth layer is illustrated in FIG. 7(a) while an undesired state of the formed diatomaceous earth layer is illustrated in FIG. 7(b).

The diatomaceous earth layer forming method described this embodiment 1 is merely one example. Out of commercially available diatomaceous earth species, some are in accordance with a specification of mixing an adhesive with diatomaceous earth into a paste form and then using the mixture. In this case, a diatomaceous earth layer should be formed in accordance with the specification.

In order to verify the humidity-adjusting performance which is the effect of the invention, a fuel cell module obtained by the above-mentioned operations was used to make a verification test.

Figure 8:
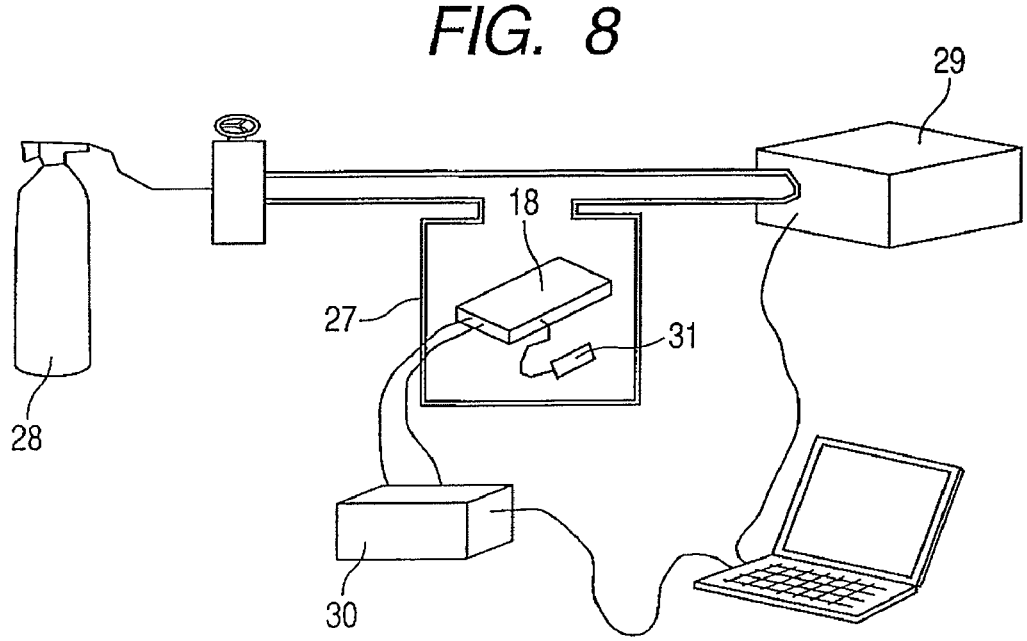
FIG. 8 is a view illustrating the structure of a testing device.

The structure of a device for the test is illustrated in FIG. 8. The form of the device is as follows: the cell module is put into a container 27, having a specified volume, both side of which have welded pipes; a cylinder 28 filled with dry air is connected to one of the pipes; and a dew point meter 29 is connected to the other. The cell module is connected to an electronic load device 30 through a hole made in the container. The hole made in the container is filled with a silicone resin (for example, KE45W, manufactured by Shin-Etsu Chemical Co., Ltd.). In the case of desiring to make a test by use of air containing moisture at some level in advance, a water tank for humidification is set between the dry air cylinder and the container. The supply of a fuel into the fuel cell module is conducted from a fuel cartridge 31.

The verification test was made while attention was paid to a change in the humidity in the container, and the voltage of the cell. Under this condition, it is preferred that the humidity change in the container is small and a fall in the voltage is small even if electric power is generated for a long term. As described above, the power of any fuel cell is affected by the humidity of the air surrounding the cell. When the humidity is high, the power falls by flooding based on water generated in the cathode. When the humidity is low, the power falls by a decrease in the amount of the network of hydrogen ions, the decrease being based on the drying of the electrolyte membrane. Accordingly, an appropriate humidity is necessary for the cell. However, the behavior of the cell to the humidity is mainly affected by characteristics of the cathode diffusion layer and the cathode electrode when the humidity is high. When the humidity is low, the behavior is mainly affected by the characteristic of the electrolyte membrane. An optimal value (unit: % RH) of the humidity is varied by the MEA forming method, the structure of the cell, the method of forming the cathode diffusion layer, and others. Thus, the optimal value is not specified without reservation. Accordingly, in the present verification test, the inside of the container was adjusted to have a certain humidity. However, the humidity was not necessarily optimal for the power of the fuel cell.

The humidity-adjusting performance of diatomaceous earth is affected by the pore diameter of the diatomaceous earth, the amount of the diatomaceous earth, and the amount of water generated from the fuel cell. When the humidity of the fuel cell is adjusted, it can be considered that it is desired to estimate the amount of water generated from the fuel cell in advance and then estimate the pore diameter and the amount of the diatomaceous earth.

In this embodiment, diatomaceous earth having an average pore diameter of about 40 Å was used. The average pore diameter was measured, using a gas adsorption method. Nitrogen gas was selected as an inert gas, and the pore diameter was obtained by the BJH (Barrett-Joyner-Halenda) method. The thickness of the diatomaceous earth layer formed on the surface of the cathode end plate 11 was set into the range of 1 to 3 mm.

In the verification test, the average pore diameter of the diatomaceous earth was about 40 Å. However, good results can be obtained when the diameter is in the range of 25 to 65 Å.

Zeolite may be used instead of diatomaceous earth. In the case of using zeolite, it is necessary to design the fuel cell in such a manner that the humidity-adjusting layer is made thicker or the humidity based on moisture generated from the cell is made smaller than in the case of using diatomaceous earth. The average pore diameter of zeolite also is preferably from 25 to 65 Å, and the thickness thereof is preferably from 1.5 to 3 mm.

In order to avoid the drying of the electrolyte membrane, the verification test was made immediately after the cell module was fabricated and then a specific aging work was made.

Figure 9:
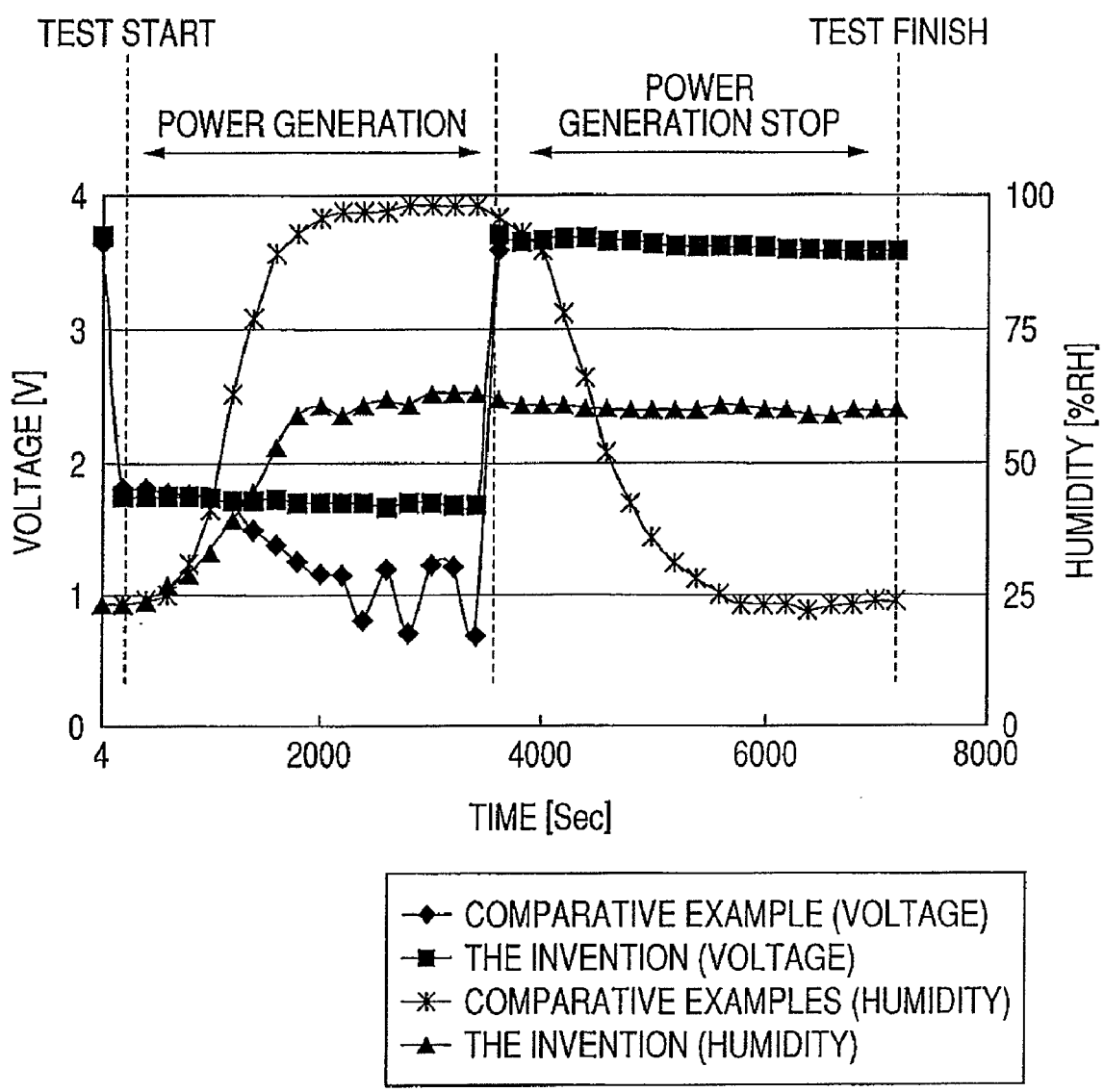
FIG. 9 is a graph showing results of a verification test.

FIG. 9 shows results of the verification test.

(1) Comparative Examples: The humidity continued to rise from the start of power generation, and then reached saturated water vapor. After a while from the time when the humidity reached the saturated water vapor, the voltage became unstable. From the step of the power generation, the humidity continued to decrease abruptly, and turned to a value substantially equal to that before the power generation.

(2) The invention: The humidity continued to rise from the start of power generation; however, the humidity became a substantially changeless value, which was in the range from 60 to 70% RH. The voltage lowered slightly after the start of the test; however, the voltage was substantially constant without turning unstable. After the stop of the power generation, the humidity did not decrease abruptly, which was different from the item (1).

As described above, according to the present embodiment, a fuel cell can be provided which is not easily affected by water vapor generated by the generation of electric power therefrom. Additionally, its MEAs are not easily dried for a long term.

Embodiment 2

Figure 10:
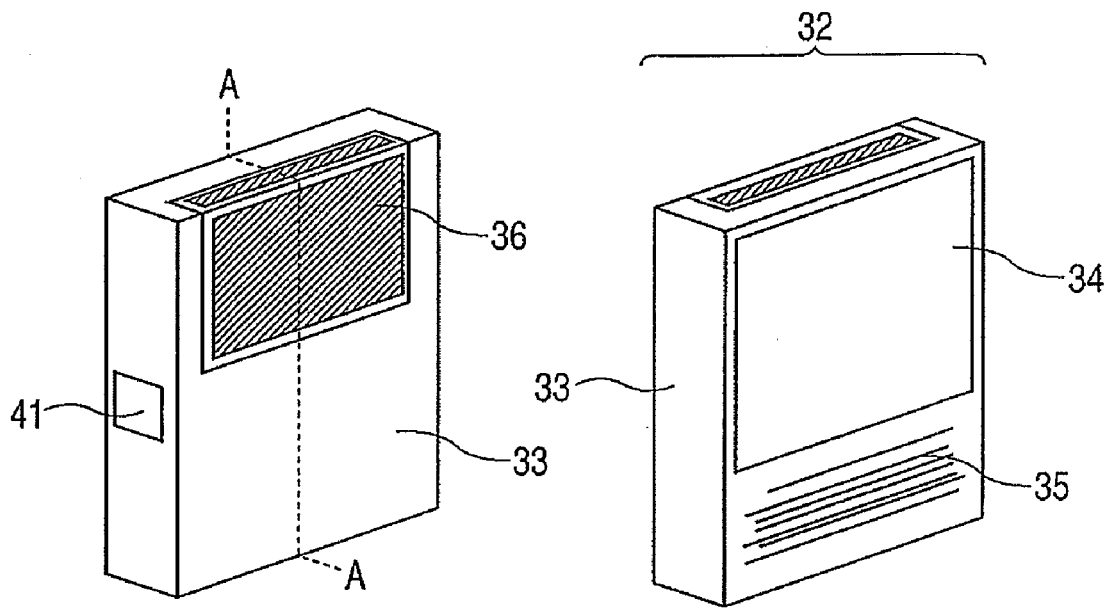
FIGS. 10A and 10B are an external appearance view of an information electronic device mounting a fuel cell and a sectional view thereof, respectively.
Figure 10:
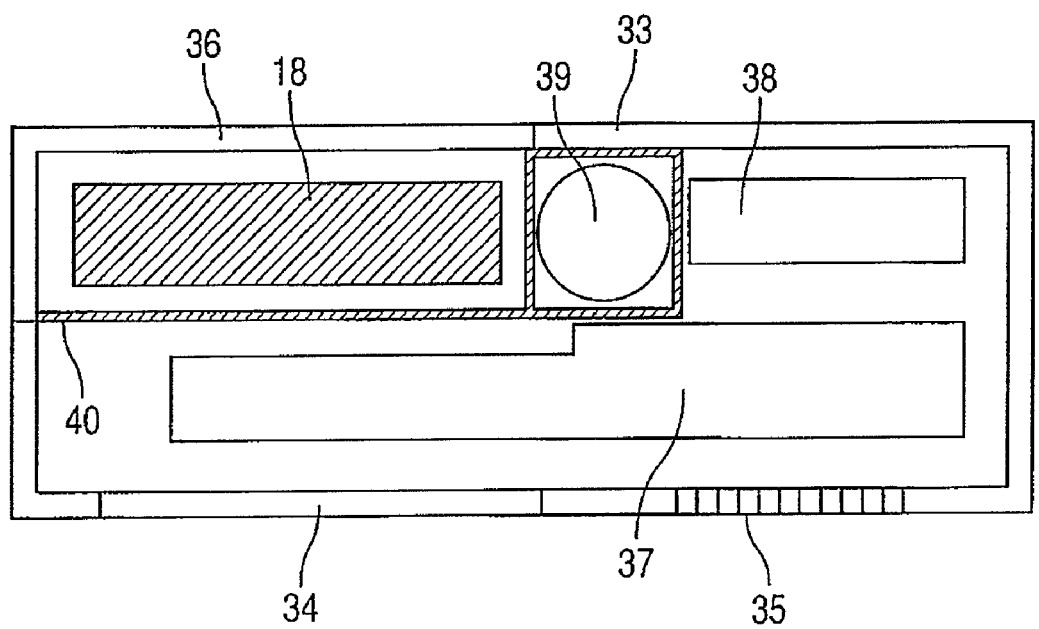

FIGS. 10(a) and (b) are each a view illustrating the outer appearance of an information electronic device 32 on which the fuel cell module 18 formed in embodiment 1 is mounted (see embodiment 1 about parts and members of the fuel cell module which are not particularly described in embodiment 2). The view on the right side of FIG. 10(a) is a front view, and the view on the left side thereof is a rear view. FIG. 10(b) is a sectional view taken on line A-A described in FIG. 10(a). Reference number 33 represents a housing of the information electronic device 32; 34, a display section; 35, operation buttons of the information electronic device 32; and 36, a slit. The slit 36 is formed to supply air from the outside to the fuel cell module 18. The fuel cell module 18 is included in the housing of the information electronic device.

FIG. 10(b) also illustrates a schematic internal structure of the information electronic device 32. The internal structure mainly has the fuel cell module 18, a circuit 37, a secondary cell 38, and a fuel cartridge 39. Auxiliaries, such as a pump for supplying a fuel, are not used. The fuel cartridge 39 can be put in and taken off. In embodiment 2, a Li cell is used as the secondary cell 38. The Li cell has a function of supporting the power generation of the fuel cell module 18. A fuel from the fuel cartridge is supplied to the fuel cell module 18 to generate electric power. When the generated electric power is used, the secondary cell 38 can be charged.

The fuel cell module 18 used in this embodiment is a fuel cell of a type of oxidizing methanol directly. The information electronic device is a device which has a display section (screen) and can input and output information.

The fuel cell module 18 has a planar shape, and is mounted on the rear side of the display section of the information electronic device 32 to be parallel to the display section.

As the information electronic device 32, shown is an information electronic device wherein a calculation processing section and a display section are contained in a single housing. However, the information electronic device 32 may be, for example, a notebook-size personal computer, a tablet-form information electronic device, or a cellular phone besides the so-called PDA (personal digital assistance) as described above.

As illustrated in FIG. 10(b), the fuel cell module 18 and the circuit 37 are partitioned with an electric non-conductive wall 40 which neither transmits water nor water vapor.

The fuel cell module 18 and the information electronic device 32 are fastened by making, in the wall 40, canals (not illustrated) each having a shape equal to the external form of the heads of fastening nuts 16 and then fitting the heads of the nuts 16 into the canals. The heads of the nuts 16 are each in a projection form, and can be expected to prevent the hindrance of the supply of air into the cathode electrode of the fuel cell module 18.

Even if the heads of the nuts are not used, it is preferred to form projections for keeping the supply of air certainly. The fuel cell module 18 may be fixed by forming projections to match with the external form of the fuel cell module 18. The fuel cell module 18 may be fixed with an adhesive tape. In accordance with the property of the adhesive tape, it is necessary to consider problems that the adhesive property thereof is damaged by water vapor generated from the fuel cell module 18 and a component of the adhesive tape is eluted by water vapor, and other problems. Tapped holes are made in the frame of the fuel cell module 18, and the module 18 may be fastened with screws. In this case, it is necessary to consider a problem that the number of fabricating steps and that of parts increase.

For the slit 36, a resin film in which holes are made is used. It is allowable to use a metallic wire netting made of stainless steel, or a punched metal, wherein holes are made in a metal plate. The material thereof is any material that is not easily corroded with a solution of methanol in water. Thus, the material may be a metal such as titanium, epoxy resin, or a resin into which carbon fiber or glass fiber is compounded.

The power from the fuel cell module 18 is supplied through the external terminal connecting section 4 to the circuit 37 present on the rear side of the display screen of the information electronic device 32.

Figure 11:
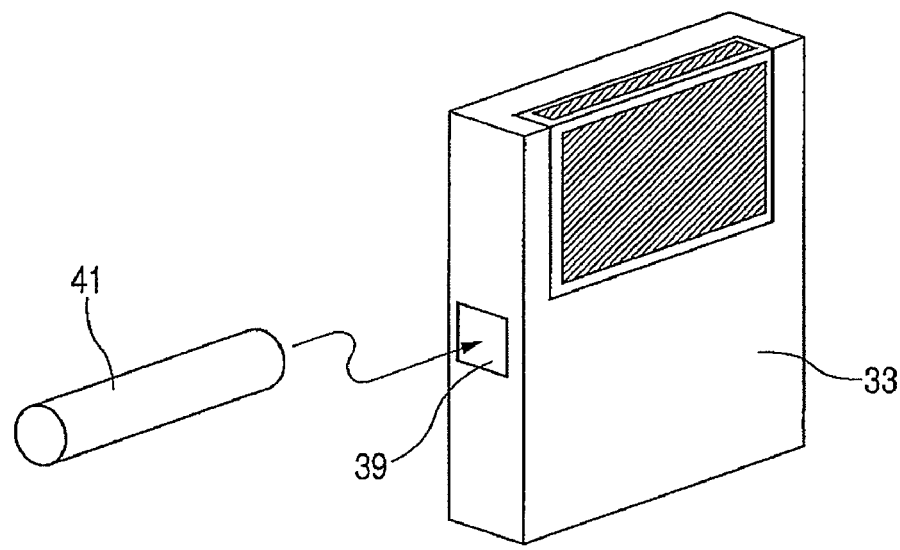
FIG. 11 is an external appearance view of an information electronic device mounting a fuel cell.

As illustrated in FIG. 11, a fuel is supplied to the fuel cell module 18 by inserting the fuel cartridge 39 into a fuel cartridge holding section 41 and sending the fuel through the tube to the tube joint 26 formed on a side face of the fuel tank frame 13.

In embodiment 2, the cartridge is used to supplement the fuel into the fuel tank. The fuel-jetting pressure in the cartridge is made sufficiently larger than the atmospheric pressure, and the pressure is adjusted to a predetermined pressure through a regulator (not illustrated). In this way, the fuel is introduced into the fuel tank. By the pressurization, the fuel to be consumed inside the fuel tank is rapidly supplied from the cartridge. Thus, the fuel tank is always filled with the fuel.

The fuel cell module 18 generates electric power while the module 18 takes in the air by natural diffusion. Thus, a filter (not illustrated) may be fitted onto a surface of the slit 36 in order to prevent the invasion of coarse particulates such as pollen and dust, smoke from cigarettes, and others as much as possible.

The driving time of the fuel cell module 18 is decided by the volume of the fuel tank, the volume of the fuel cartridge, and the concentration of methanol. The fuel tank has a volume capable of receiving 25 cc of a methanol solution in water having a methanol concentration of 20% by weight, and the fuel cartridge has a volume capable of receiving 5 cc of a methanol solution in water having a methanol concentration of 20% by weight. Each of the same fuel cartridges as described above can be used over about 2 hours.

The used fuel is a fuel having a methanol concentration of 20% by weight; however, a fuel having a higher concentration may be used as long as characteristics of the constituting members, such as the MEAs and the end plates, are not damaged.

In order to verify the humidity-adjusting performance which is the advantageous effect of the invention, an information electronic device obtained by the above-mentioned operations was used to make a verification test.

Figure 12:
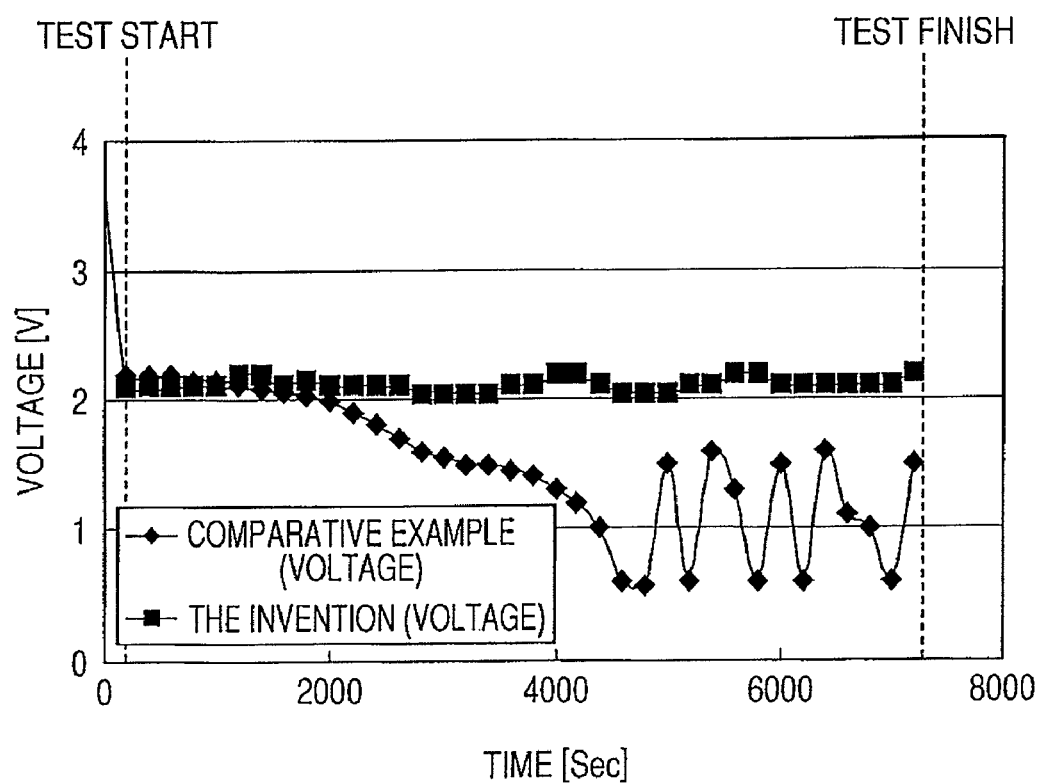
FIG. 12 is a graph showing results of a verification test.

The results are shown in FIG. 12. The verification test was made in the state that the fuel cell module 18 was mounted on the information electronic device 32. A load was imposed onto the cell by controlling the circuit 37 mounted on the information electronic device 32. The circuit in embodiment 2 was in a form that a constant current was always imposed from the cell. The voltage was observed at the external terminal connecting section 4. The observation was made in the state that wiring was inserted from a voltmeter put outside the housing into the slit and the wiring was connected to the external terminal connecting section 4. In the verification test, attention was paid to a change in the cell voltage depending on the time of power generation. Under this condition, it is preferred that a fall in the voltage is small even if electric power is generated for a long time. In the test, as a comparative example, the following was used: an information electronic device into which a fuel cell module fabricated by using an end plate having the very same shape as the end plates used in the present embodiment but having, in any surface, no painted diatomaceous earth. The test results thereof are also shown in FIG. 12. As is evident from FIG. 12, in the cell module of the present embodiment, the fall in the voltage was smaller for a long term than in the comparative example.

As described above, according to the present embodiment, a fuel cell is not affected by water vapor generated by the power generation thereof. Thus, it is possible to provide an information electronic device mounting a fuel cell wherein MEAs are not easily dried for a long time.

What is claimed is:

1. A fuel cell, wherein a cell unit comprising an anode, a cathode and a hydrogen ion conductive polymeric electrolyte membrane formed between the anode and the cathode is sandwiched between a cathode end plate which is fitted to a cathode side of the cell unit, the cathode end plate having a through hole for supplying oxygen to the cathode and a layer comprising a humidity-adjusting component, and an anode end plate which is fitted to an anode side of the cell unit, the anode end plate having a through hole for supplying fuel to the anode.

2. The fuel cell, comprising a cell unit comprising an anode, a cathode and a hydrogen ion conductive polymeric electrolyte membrane formed between the anode and the cathode, and a member fitted to a cathode side of the cell unit, wherein the member has a layer comprising a humidity-adjusting component and wherein the layer comprising the humidity-adjusting layer has a porous particle layer and an adhesive layer which is thinner than the porous particle layer.

3. The fuel cell according to claim 2, wherein a solution of methanol in water and air are supplied to the anode and the cathode, respectively.

* * * * *